United States Patent [19]

Clay et al.

[11] 4,299,665
[45] Nov. 10, 1981

[54] SEPARATION APPARATUS FOR IMMISCIBLE LIQUIDS

[75] Inventors: B. Jan Clay, Indianapolis; Phillip H. Braun, Camby; Rudy Vingris, Indianapolis, all of Ind.

[73] Assignee: DCI Corporation, Indianapolis, Ind.

[21] Appl. No.: 172,172

[22] Filed: Jul. 25, 1980

[51] Int. Cl.³ .................... B01D 3/38; B01D 21/10
[52] U.S. Cl. .................... 202/204; 203/39; 203/95; 210/320; 210/540; 210/DIG. 5
[58] Field of Search .................... 202/204, 234; 203/39, 203/92–97; 210/DIG. 5, 540, 537, 320

[56] References Cited

U.S. PATENT DOCUMENTS

| | | | |
|---|---|---|---|
| 322,817 | 7/1885 | Garrett | 210/540 |
| 3,334,025 | 8/1967 | Reid | 202/204 |
| 3,527,348 | 9/1970 | Lalonde et al. | 210/540 |
| 3,666,633 | 5/1972 | Essex et al. | 203/95 |
| 3,692,467 | 9/1972 | Durr et al. | 8/158 |
| 3,731,802 | 5/1973 | James | 210/540 |
| 3,853,513 | 12/1974 | Carson | 55/185 |
| 3,862,040 | 1/1975 | Preus et al. | 210/540 |
| 3,907,682 | 9/1975 | Basseet | 210/540 |
| 4,036,701 | 7/1977 | Clay | 202/204 |
| 4,104,167 | 8/1978 | Besik | 210/195 S |
| 4,208,291 | 6/1980 | Ochoa | 210/540 |

Primary Examiner—Wilbur L. Bascomb, Jr.
Attorney, Agent, or Firm—Woodard, Weikart, Emhardt & Naughton

[57] ABSTRACT

A separation apparatus for separating immiscible liquids is disclosed which includes an apparatus of four tanks including outlets of differing heights to provide for separation of the immiscible liquids according to their specific gravities. The apparatus is complete in itself and is operable to separate the heavier than water solvents and the lighter than water solvents from water without need for alterations of the design or other special provisions.

21 Claims, 5 Drawing Figures

4,299,665

SEPARATION APPARATUS FOR IMMISCIBLE LIQUIDS

BACKGROUND OF THE INVENTION

1. Field of the Invention

The present invention relates to steam distillation and liquid separation processes, and in particular relates to an apparatus for separating water from both lighter and heavier immiscible solvents.

2. Description of the Prior Art

A steam distillation apparatus for recycling various solvents which are immiscible in water are well known. Devices for separating water from the distilled solvent are also well known. One such separation device is disclosed in U.S. Pat. No. 3,692,467, issued to Durr et al. on Sept. 19, 1972. While such devices perform admirably for the solvent for which they were designed, they are not appropriate for use with both solvents which are heavier than water and solvents which are lighter than water. Since the materials used in manufacturing such devices are typically high quality stainless steel, the cost of a separate water separator for a second type of solvent is quite high.

Other solvent separating or recovery systems are also known in the prior art. In U.S. Pat. No. 3,666,633, issued to Essex et al. on May 30, 1972, there is disclosed an apparatus for recovering organic solvents immiscible with water. Similar apparatus are also disclosed in U.S. Pat. Nos. 3,853,513, issued to Carson on Dec. 10, 1974, and 3,334,025, issued to Reid on Aug. 1, 1967. As is typical of most of the prior art devices, however, the devices disclosed in the above patents are not useful in separating solvents which are heavier than water as well as solvents which are lighter than water from the distillate water.

A device intended for separating both the heavier and lighter immiscible solvents from water is disclosed in U.S. Pat. No. 4,036,701, issued to Clay et al. on July 19, 1977. As disclosed in that reference, the distillation apparatus and associated separation means comprised an apparatus which was convertible to accommodate the solvents that were heavier or lighter than the water. In particular, a pair of outlet openings from the first tank were designed and located such that the attachment of a tube extending selectively from one or the other to the bottom of the tank would permit the apparatus to operate to separate water from either a lighter solvent or a heavier solvent. The Clay et al. device represents a significant improvement over some of the prior art devices in the fact that a device was provided which was readily convertible for use with either lighter or heavier than water solvents. The present invention provides a further improved apparatus which does not require a conversion but it directly usable with a mixture of water and both heavier and lighter than water solvents.

SUMMARY OF THE INVENTION

Briefly described, in one aspect of the present invention there is provided a separation apparatus which includes first, second and third tanks, the first tank having a first outlet in the upper portion of the tank and lower than a second outlet in the first tank. The second tank similarly includes a third outlet in the upper portion of the tank and lower than a fourth outlet in the second tank, and the third tank includes a fifth outlet in the upper portion of the tank and below a sixth outlet in the third tank. Conduits are provided for connecting the first, third and fifth outlets to a point near the bottom of the first, second and third tanks, respectively. The first outlet of the first tank is connected with an inlet of the second tank, and the second outlet of the first tank is connected with an inlet of the third tank.

It is an object of the present invention to provide a separation apparatus which is useful in separating both lighter and heavier than water solvents from distillate water.

A further object of the present invention is to provide a separation apparatus which is complete in itself and which does not require conversion to accommodate differing solvent and water mixtures.

It is another object of the present invention to provide a separation apparatus which is simple and relatively inexpensive in construction and which is easily and quickly operated to perform the separation process.

It is a further object of the present invention to provide a separation apparatus which is useful in connection with a great variety of solvent and water mixtures.

It is a further object of the present invention to provide a separation apparatus which avoids the necessity in the prior art to either separate materials prior to distillation and introduction into a separation system or to stop the distillation process at a predetermined temperature to change or modify the separation system before further distillation.

Further objects and advantages of the present invention will become apparent from the description of the preferred embodiment which follows.

DESCRIPTION OF THE PREFERRED EMBODIMENT

Figure 1:
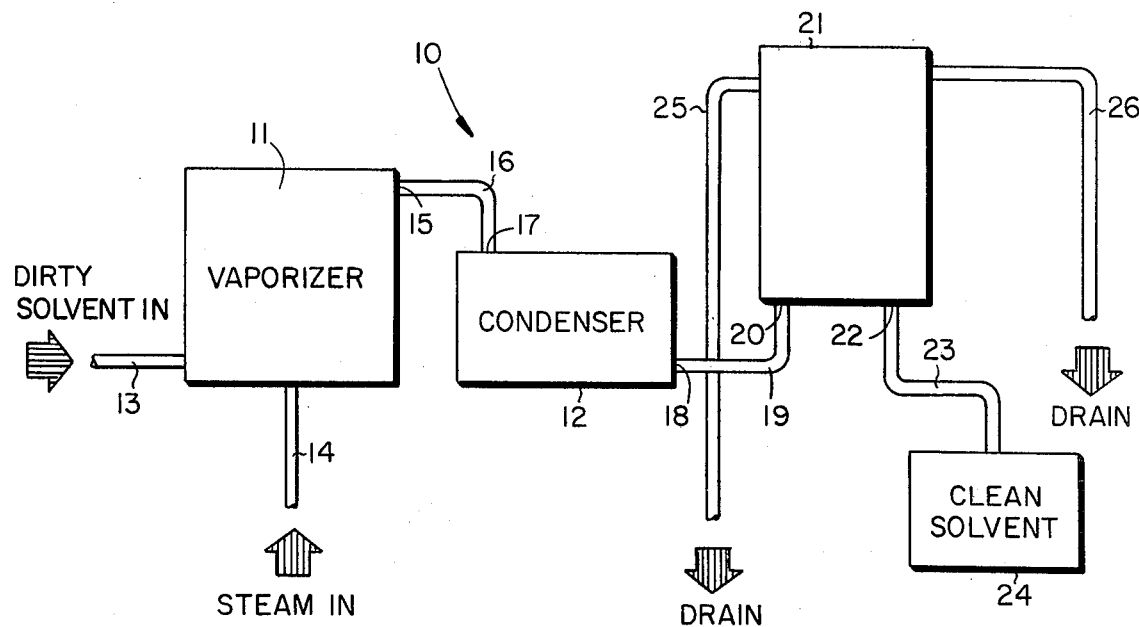
FIG. 1 is a schematic diagram of a system incorporating the apparatus of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown a schematic representation of a system utilizing a separation apparatus of the present invention. The system 10 includes a vaporizer 11 and a condenser 12. The vaporizer 11 has a dirty solvent inlet 13, a steam inlet 14 and a vapor outlet 15. The vapor outlet 15 connects through a conduit 16 to an inlet 17 of the condenser 12. Condenser 12 further includes a condensed liquid outlet 18 which connects through conduit 19 to the inlet 20 of the separation apparatus 21. Distillation or vaporizer unit 11 and the associated components are of conventional design and produce a distillation of the solvent by vigorous admixture of steam with the dirty solvent and condensation of the resulting vapors. The separation apparatus, which will be detailed further below, includes a solvent outlet 22 connected through a conduit 23 to a clean solvent storage unit 24. The apparatus 21 further includes drain conduits 25 and 26 which direct the separated water to a drain or to a storage unit.

Figure 2:
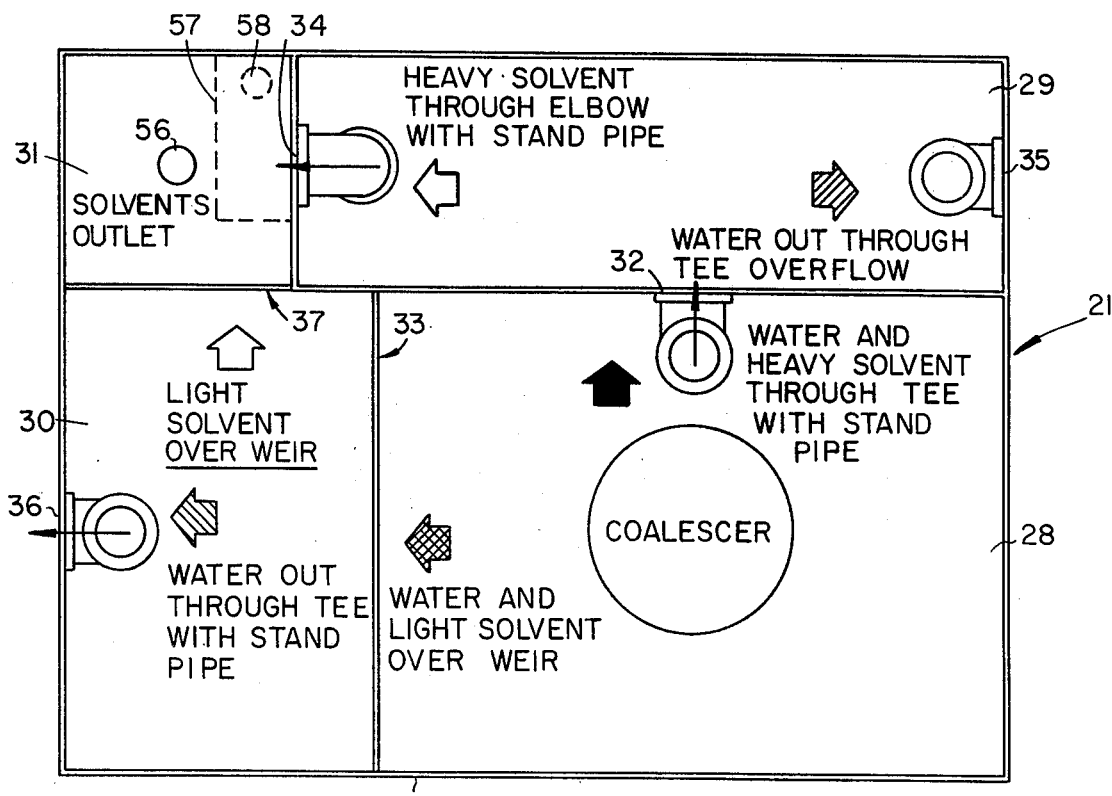
FIG. 2 is a top, plan schematic view of a separation apparatus constructed in accordance with the present invention.
Figure 3:
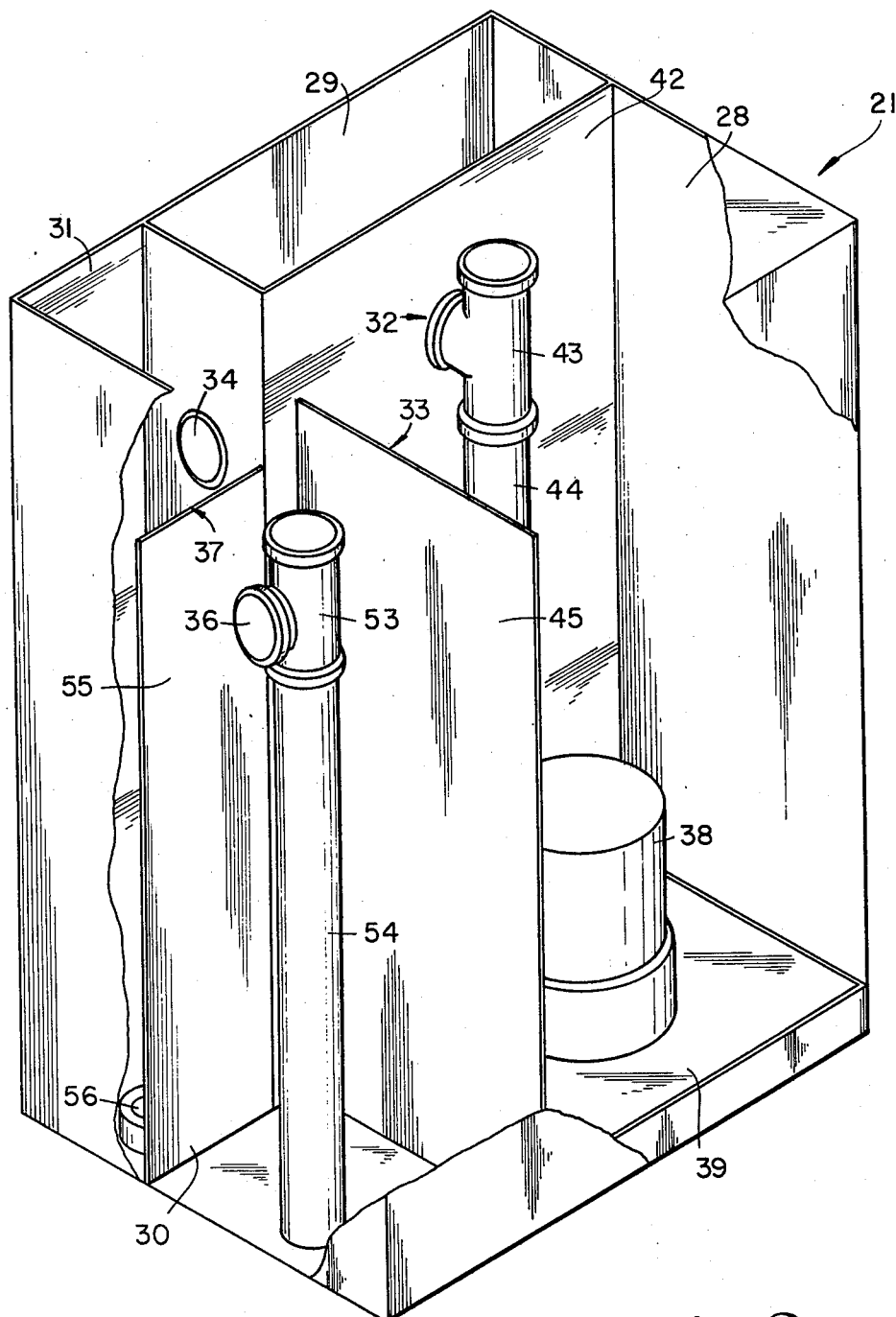
FIG. 3 is a perspective view of a separation apparatus according to the present invention, with portions of the front walls broken away to reveal the interior details.
Figure 4:
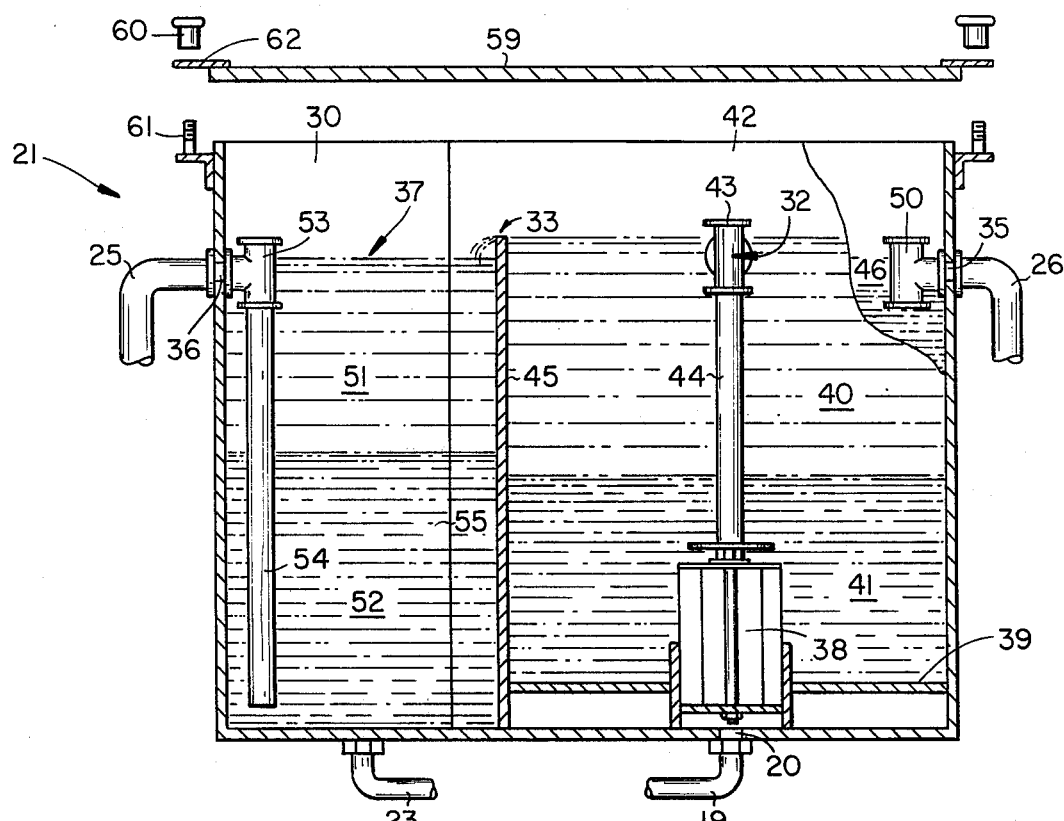
FIG. 4 is a front, cross-sectional view of the separation apparatus of FIG. 3, particularly showing the liquid levels and movement in the first and third tanks.

The construction operation of the preferred embodiment of the present invention is made apparent from the drawings of FIGS. 2-5. In FIG. 2 there is shown a somewhat schematic representation of the separation apparatus of the present invention. The apparatus preferably includes a walled container 27 which defines first, second, third and fourth tanks 28-31 respectively. It will be appreciated from the following description however, that the tanks could be separate units interconnected by appropriate conduit means consistent with the described format.

Before giving a detailed description of the preferred embodiment, a brief description of the unit's operation will be provided. The first tank 28 includes a first outlet opening 32 and a second outlet opening 33. The solvent and water mixture received from the condenser unit 12 will initially contain water and the heavier than water solvents. As the immiscible liquids separate into layers within the first tank, the heavier than water solvents will initially be forced through the first outlet opening 32 into the second tank 29. At this time a portion of the water will flow past the second outlet opening and into the third tank. As time progresses, the water and solvent mixture received from the condenser unit 12 will include a mixture of water and lighter than water solvents. As this occurs, the water as the heavier component will be forced into the third tank and the lighter than water solvents will pass into the second tank. In this manner, the second tank will include water and heavier than water solvents whereas the third tank will include water and lighter than water solvents.

The second tank includes a third outlet opening 34 and a fourth outlet opening 35. By the provided design, the heavier solvents will be forced through the third outlet opening and into the fourth tank, whereas the lighter water will pass through the fourth outlet opening. Similarly, the water in the third tank is the heavier component in that tank and will therefore be forced through the fifth outlet opening 36, whereas the lighter solvents in the third tank will pass through the sixth outlet opening 37 and into the fourth tank. In this fashion, the heavier and lighter than water solvents are collected in the fourth tank whereas the water is discharged through the fourth and fifth outlet openings to a suitable drain or storage facility.

More particularly, the first tank 28 includes an inlet 20 (FIG. 4) connected through conduit 19 to the condenser 12. A coalescer 38 is affixed to the base of the first tank 28, extending through the raised floor 39 and connecting to the inlet 20 so that all of the liquids flowing into the first tank are forced to pass through the coalescer. The coalescer 38 may be of a type disclosed in U.S. Pat. No. 3,692,467, previously cited, and that patent is hereby incorporated by reference into this application.

As the water fills the first tank 28, there will be a separation of layers into a lighter liquid component 40 and a heavier component 41. As previously suggested, during the earlier stages of the separation process, the lighter liquid 40 will be water and the heavier liquid 41 will be the heavier than water solvent.

The first tank 28 includes a first outlet opening 32 communicating through wall 42 from the first tank to the second tank. A tee connector 43 open at the top is attached at the opening 32 and connects with a downwardly extending stand pipe 44 which extends to about the bottom of the first tank. The second outlet opening 33 of the first tank preferably comprises a weir 45 which is a wall extending upwardly from the bottom of the first tank and between the first and third tanks. The top of the weir 45, and therefore the second outlet opening, is located above the first outlet opening 32. By this configuration, the liquid level is permitted to rise within the tank to an extent which causes the heavier liquid 41 to pass upwardly through the stand pipe 44 and tee 43 and out the first outlet opening 32, while at the same time the lighter liquid 40 will spill over the top at the weir 45 into the third tank.

In the initial stages of the separation process, the heavier liquid 41 passing into the second tank 29 will be the heavier than water solvents, whereas the lighter liquid 40 passing over the weir and into the third tank 30 will be the water. With the passage of time, the liquid entering the first tank will comprise water and the lighter than water solvents and in that instance the lighter liquid 40 will be the solvent and the heavier liquid 41 will be the water. Under those conditions, the water will pass upwardly through the stand pipe 44 and tee 43 into the second tank 29, and the lighter than water solvents will pass over the weir 45 and into the third tank 30.

Figure 5:
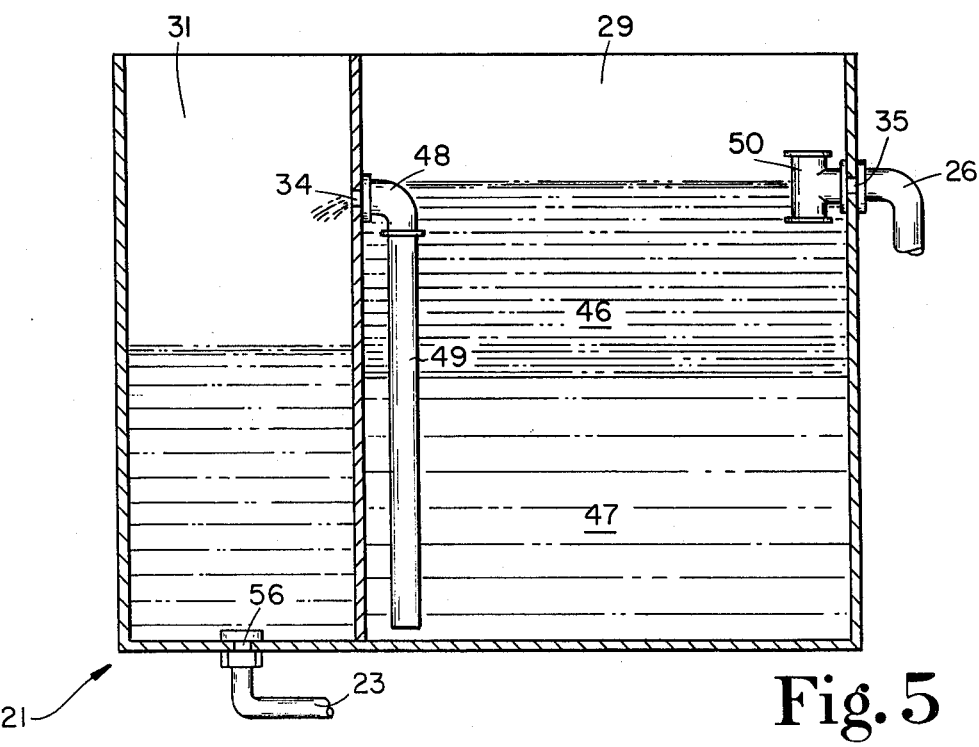
FIG. 5 is a front, cross-sectional view of the separation apparatus of FIG. 3, and in particular showing the liquid location and movement in the second and fourth tanks.

Referring in particular to FIG. 5, there is shown the second tank 29 which includes an upper layer of the lighter water 46 and a lower layer of the heavier than water solvents 47. The second tank 29 includes a third outlet opening 34 to which is connected an elbow 48 attached to a downwardly extending stand pipe 49 which extends to about the bottom of the second tank. The second tank also includes the fourth outlet opening 35 to which is connected a tee fitting 50 which is open at the top end. A water drain conduit 26 is attached to the second tank at the outside wall at the location of the fourth outlet opening 35. The outlet opening 35 is located higher than the outlet opening 34, as shown in the drawings. By this configuration, the liquid level in the second tank is allowed to rise to a point that the heavier than water solvents 47 are forced upwardly through the stand pipe 49 and tee 48 and through the third outlet opening 34 into the fourth tank 31. At the same time, the lighter water 46 passes through the tee fitting 50 and the fourth outlet opening 35 and into the drain conduit 26 by which it is directed to a suitable drain or storage facility.

Referring again to FIG. 4, there is shown the third tank 30 which includes a lighter layer of liquid 51 and a heavier layer of liquid 52, the lighter liquid being the lighter than water solvents and the heavier liquid being water. The third tank 30 includes a fifth outlet opening 36 and a sixth outlet opening 37. A tee fitting 53 open at the top is connected at the fifth outlet opening 36 and connects with a downwardly extending stand pipe 54 which extends to about the bottom of the third tank 30. The sixth outlet opening preferably comprises a weir which consists of a wall 55 extending upwardly between the third and fourth tanks. The top of the weir 55, and therefore the sixth outlet opening, is located above the fifth outlet opening 36 as shown in the drawings. By the configuration shown, the heavier water 52 is forced upwardly through the stand pipe 54 and tee 53 and out the fifth outlet opening 36 into a water drain conduit 25 extending to a suitable drain or storage facility. At the same time, the lighter solvents 51 are forced over the weir 55 through the sixth outlet opening 37 and into the fourth tank 31.

The fourth tank is preferably used as a collection for both the lighter than water and heavier than water solvents. The fourth tank 31 is provided with an outlet 56 (FIG. 3) connecting through conduit 23 to a clean solvent storage unit 24. It will be appreciated that the fourth tank could be readily modified to provide for separate collection of the heavier than water solvents from the lighter than water solvents. For example, a wall 57 (FIG. 2) could be included to provide for the separate collection of the heavier than water solvents entering through the third outlet opening 34. In this instance, a separate outlet 58 could be provided to direct the heavier than water solvents to a suitable storage unit.

The separation unit 21 is provided with a cover 59 which may be attached, for example, with wing nuts 60 received upon bolts 61 extending through holes in plates 62 secured to the cover.

By way of specific example, a suitable arrangement is provided by the use of a container which is 24 inches long, 18 inches wide and 34 inches tall. A suitable arrangement for the levels of the various outlet openings would be as follows. The center of the first outlet opening to which the tee 43 connects is located at 28 inches above the bottom of the container, with the top of the weir 45 about 1 inch higher or about even with the top of the first outlet opening. The centers of the fourth and fifth outlet openings to which the tees 50 and 53 connect, respectively, are located at 26 inches above the bottom of the container with the top of the weir 55 being about 1 inch higher or about level with the top of the fifth outlet opening. The center of the third outlet opening to which the elbow 48 connects is located at 23 inches above the bottom of the container. It will be appreciated, however, that this specific example was given only as a means to exemplify the appropriate relative locations for the outlet openings, and that other configurations and placements will be possible depending upon the size and placement of the various tanks and other components.

It is particularly preferable that essentially all parts of the distillation apparatus and separation apparatus which contact the distilled solvent, except the coalescer 38, are made of stainless steel to ensure inertness of the materials and long life. As other particular alternatives for the present invention, the vaporizer portion of the invention could be made to incorporate aspects of the disclosure of U.S. Pat. No. 3,853,513, if desired, and also a water screen such as is shown in U.S. Pat. No. 3,692,467 may be used.

The separation apparatus of the present invention provides a system which will readily and efficiently separate both heavier and lighter than water solvents from water. As a result, the previously recited purposes and advantages are fulfilled with a system which is simple and durable in construction and very simple to operate.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A separation apparatus for separating immiscible liquids which comprises:

a first tank having an inlet, a first outlet opening in the upper portion of said first tank, and a second outlet opening higher than the first outlet opening, said first tank further including first conduit means for connecting the first outlet opening to a point near the bottom of said first tank;

a second tank having an inlet, a third outlet opening in the upper portion of said second tank, and a fourth outlet opening higher than the third outlet opening, the first outlet opening of said first tank being connected with the inlet of said second tank, said second tank further including second conduit means for connecting the third outlet opening to a point near the bottom of said second tank; and a third tank having an inlet, a fifth outlet opening in the upper portion of said third tank, and a sixth outlet opening higher than the fifth outlet opening, the second outlet opening of said first tank being connected with the inlet of said third tank, said third tank further including third conduit means for connecting the fifth outlet opening to a point near the bottom of said third tank.

2. The apparatus of claim 1 and which includes a fourth tank having first and second inlets and an outlet, the third outlet opening of said second tank being connected with the first inlet of said fourth tank and the sixth outlet opening of said third tank being connected with the second inlet of said fourth tank.

3. The apparatus of claim 1 in which said first tank includes a coalescer connected to the inlet whereby all of the liquids flowing into said first tank are forced to pass through the coalescer.

4. The apparatus of claim 1 in which the second outlet opening comprises a weir extending upwardly to a level higher than the first outlet opening.

5. The apparatus of claim 1 in which the sixth outlet opening comprises a weir extending upwardly to a level higher than the fifth outlet opening.

6. The apparatus of claim 5 in which the second outlet opening comprises a weir extending upwardly to a level higher than the first outlet opening.

7. The apparatus of claim 1 and which includes a walled container defining said first, second and third tanks.

8. The apparatus of claim 7 in which said first tank includes a coalescer connected to the inlet whereby all of the liquids flowing into said first tank are forced to pass through the coalescer.

9. The apparatus of claim 7 in which said first tank is adjacent said third tank, the second outlet opening comprising a weir extending upwardly between said first and third tanks to a level higher than the first outlet opening.

10. The apparatus of claim 7 in which said walled container further defines a fourth tank having first and second inlets and an outlet, the third outlet opening of said second tank being connected with the first inlet of said fourth tank and the sixth outlet opening of said third tank being connected with the second inlet of said fourth tank.

11. The apparatus of claim 10 in which said fourth tank is adjacent each of said second and third tanks.

12. The apparatus of claim 11 in which the sixth outlet opening comprises a weir extending upwardly between said third and fourth tanks to a level higher than the fifth outlet opening.

13. The apparatus of claim 12 in which said first tank is adjacent said third tank, the second outlet opening comprising a weir extending upwardly between said first and third tanks to a level higher than the first outlet opening.

14. The apparatus of claim 13 in which said first tank includes a coalescer connected to the inlet whereby all of the liquids flowing into said first tank are forced to pass through the coalescer.

15. The apparatus of claim 1 and which further includes a vaporizer having a steam inlet, a dirty solvent inlet and a vapor outlet, and a condenser having an inlet connected to the vapor outlet of said vaporizer and having a liquid outlet for condensed liquids, the inlet of said first tank being connected to the liquid outlet of said condenser.

16. The apparatus of claim 15 in which said first tank includes a coalescer connected to the inlet whereby all of the liquids flowing into said first tank are forced to pass through the coalescer.

17. The apparatus of claim 15 and which includes a fourth tank having first and second inlets and an outlet, the third outlet opening of said second tank being connected with the first inlet of said fourth tank and the sixth outlet opening of said third tank being connected with the second inlet of said fourth tank.

18. The apparatus of claim 15 and which includes a walled container defining said first, second and third tanks.

19. The apparatus of claim 18 in which said walled container further defines a fourth tank having first and second inlets and an outlet, the third outlet opening of said second tank being connected with the first inlet of said fourth tank and the sixth outlet opening of said third tank being connected with the second inlet of said fourth tank.

20. The apparatus of claim 19 in which said first tank is adjacent said third tank, the second outlet opening comprising a weir extending upwardly between said first and third tanks to a level higher than the first outlet opening, and in which said fourth tank is adjacent each of said second and third tanks, the sixth outlet opening comprising a weir extending upwardly between said third and fourth tanks to a level higher than the fifth outlet opening.

21. The apparatus of claim 20 in which said first tank includes a coalescer connected to the inlet whereby all of the liquids flowing into said first tank are forced to pass through the coalescer.

* * * * *

UNITED STATES PATENT AND TRADEMARK OFFICE
CERTIFICATE OF CORRECTION

PATENT NO. : 4,299,665

DATED : November 10, 1981

INVENTOR(S) : B. Jan Clay et al.

It is certified that error appears in the above-identified patent and that said Letters Patent is hereby corrected as shown below:

The title page should be deleted to appear as per attached title page,

Signed and Sealed this

Thirteenth Day of July 1982

[SEAL]

Attest:

Attesting Officer

GERALD J. MOSSINGHOFF

Commissioner of Patents and Trademarks

United States Patent [19]

Clay et al.

[11] 4,299,665
[45] Nov. 10, 1981

[54] SEPARATION APPARATUS FOR IMMISCIBLE LIQUIDS

[75] Inventors: B. Jan Clay, Indianapolis; Phillip H. Braun, Camby; Rudy Vingris, Indianapolis, all of Ind.

[73] Assignee: DCI Corporation, Indianapolis, Ind.

[21] Appl. No.: 172,172

[22] Filed: Jul. 25, 1980

[51] Int. Cl.³ .................. B01D 3/38; B01D 21/10
[52] U.S. Cl. .................. 202/204; 203/39; 203/95; 210/320; 210/540; 210/DIG. 5
[58] Field of Search .................. 202/204, 234; 203/39, 203/92-97; 210/DIG. 5, 540, 537, 320

[56] References Cited

U.S. PATENT DOCUMENTS

| 322,817 | 7/1885 | Garrett | 210/540 |
|---|---|---|---|
| 3,334,025 | 8/1967 | Reid | 202/204 |
| 3,527,348 | 9/1970 | Lalonde et al. | 210/540 |
| 3,666,633 | 5/1972 | Essex et al. | 203/95 |
| 3,692,467 | 9/1972 | Durr et al. | 8/158 |
| 3,731,802 | 5/1973 | James | 210/540 |
| 3,853,513 | 12/1974 | Carson | 55/185 |
| 3,862,040 | 1/1975 | Preus et al. | 210/540 |
| 3,907,682 | 9/1975 | Basseet | 210/540 |
| 4,036,701 | 7/1977 | Clay | 202/204 |
| 4,104,167 | 8/1978 | Besik | 210/195 S |
| 4,208,291 | 6/1980 | Ochoa | 210/540 |

Primary Examiner—Wilbur L. Bascomb, Jr.
Attorney, Agent, or Firm—Woodard, Weikart, Emhardt & Naughton

[57] ABSTRACT

A separation apparatus for separating immiscible liquids is disclosed which includes an apparatus of four tanks including outlets of differing heights to provide for separation of the immiscible liquids according to their specific gravities. The apparatus is complete in itself and is operable to separate the heavier than water solvents and the lighter than water solvents from water without need for alterations of the design or other special provisions.

21 Claims, 5 Drawing Figures

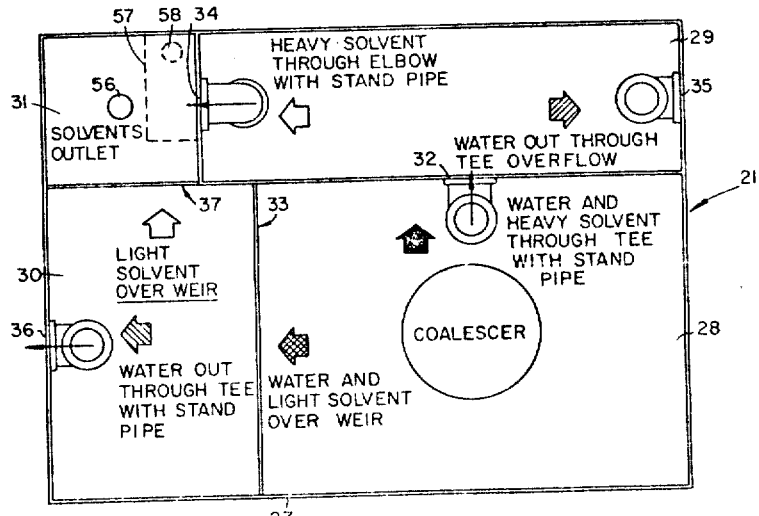

Fig.2